United States Patent [19]

Rao et al.

[11] Patent Number: 5,657,450
[45] Date of Patent: Aug. 12, 1997

[54] METHOD AND APPARATUS FOR TIME ESTIMATION AND PROGRESS FEEDBACK ON DISTAL ACCESS OPERATIONS

[75] Inventors: Ramana B. Rao, San Francisco; Anand Rajaraman, Stanford, both of Calif.

[73] Assignee: Xerox Corporation, Stamford, Conn.

[21] Appl. No.: 559,384

[22] Filed: Nov. 15, 1995

[51] Int. Cl.$^6$ .............................. G06F 11/34; G06F 17/30
[52] U.S. Cl. ............... 395/610; 395/200.03; 395/200.47; 364/569
[58] Field of Search .......................... 395/610, 200.09, 395/835, 838, 839, 184.01

[56] References Cited

U.S. PATENT DOCUMENTS

| | | | |
|---|---|---|---|
| 5,301,317 | 4/1994 | Lohman et al. | 395/602 |
| 5,335,345 | 8/1994 | Frieder et al. | 395/605 |
| 5,432,932 | 7/1995 | Chen et al. | 395/673 |
| 5,483,468 | 1/1996 | Chen et al. | 364/551.01 |
| 5,553,235 | 9/1996 | Chen et al. | 395/182.18 |
| 5,553,239 | 9/1996 | Heath et al. | 395/187.01 |

OTHER PUBLICATIONS

Rao, R., Russell, D.M., and Mackinlay, D., "System Components for Embedded Information Retrieval from Multiple Disparate Information Sources", *Proceedings of 1993 ACM Symposium On User Interface Software And Technology*, Atlanta, GA, Nov. 1993.

Rao, R., Pedersen, J.O., Hearst, M.A., Mackinlay, J.D., Card, S.K., Masinter, L., Halvorsen, P-K., & Robertson, G.G., "Rich Interaction in the Digital Library", *Communications of the ACM*, Apr. 1995, vol. 38, No. 4, pp. 29–39.

*Primary Examiner*—Paul V. Kulik
*Attorney, Agent, or Firm*—Richard B. Domingo

[57] ABSTRACT

A method and apparatus for providing time estimates and progress feedback on long-running distal information source access operations. An intermediate server that is "close" to a client workspace creates time estimates and progress information for operations using models of known information sources and an estimated merge processing cost. The model provides information as to how long various operations take for each of the known information sources during predetermined intervals of the day. During the course of interaction with the known information sources, the intermediary server builds the model. The model will take into account a variety of implicit factors including network distance and operation complexity, and explicit factors including time of day and operation type. The present invention will synthesize the model information for multiple information sources when the query is directed to a plurality of information sources. The estimated merge processing cost is processing overhead associated with merging the results obtained for operations over multiple information sources.

10 Claims, 8 Drawing Sheets

METHOD AND APPARATUS FOR TIME ESTIMATION AND PROGRESS FEEDBACK ON DISTAL ACCESS OPERATIONS

FIELD OF THE INVENTION

The present invention is related to the field of accessing information from distal sources on a network.

BACKGROUND OF THE INVENTION

With the advent of networking technology, the ability to access information from distal sources has greatly increased. The explosive growth of the World Wide Web and commercial on-line networks and information sources are indicative of the high demand for accessing information. However, it is typical that such access is not instantaneous. For example, an operation for obtaining copies of information may require a period of time longer than the user may want or have. It is beneficial for a user to know how much time is required for performing an operation on a distal source, as well as the progress of the operation being performed.

The notion of a progress feedback indicator has been widely incorporated into both user and program interfaces. Many application programs provide upfront feedback on estimated time for an operation, e.g. the Norton Backup product available from the Symantec Corporation presents an estimated time to perform a backup. Installers for installing application software programs on personal computers provide feedback on the progress of an installation of the software applications. Print managers typically report status of printing requests (e.g. sending/printing/completed).

Almost all serial upload and download programs (e.g. on-line services like America On-Line and Compuserve) estimate how long file and message transfers will take and provide progress reports. They use the connection rate (e.g. 14400 bps) to estimate an initial transfer time, and then they continually measure the actual bytes/second as the transfer is underway. This mode of transfer now runs almost identically over networks (e.g. via the Mac Communications Toolbox) so there is now a class of network file clients that provides such information. However, this method does not take into account various factors such as current network traffic and any delays that may be incurred at either the source or the recipient.

An architecture for a system for interacting with distal information sources is described in the article "System Components For Embedded Information Retrieval From Multiple Disparate Information Sources", Rao et al., *Proceedings of the ACM Symposium on User Interface Software and Technology*, ACM press, (November 1993). With respect to interacting with such distal information sources, various operations may be performed (e.g. searches or download of information). Such operations tend to be long-running. If a user knowingly executes a long-running operation, they are able to remain productive by performing some other task. Further, progress feedback provides a user with reassurance that the requested operation is being performed. Thus, it is desirable to obtain accurate time estimate and progress information related to the execution of such operations

SUMMARY

A method and apparatus for providing time estimates and progress feedback on long-running distal information source access operations is disclosed. A user operating in a client workspace gains access to multiple information sources through an intermediary server that is "close" to a client workspace (i.e. where the latencies and delays between the two are predictable and short). The client workspace and the intermediary server communicate using a generic protocol. The intermediary server in turn communicates with the various information servers using a protocol supported by the information source. The intermediary server synthesizes or otherwise obtains time and progress estimates responsive to such user requests. For operations involving multiple information sources, time estimates are obtained for each information source and then synthesized to obtain time estimates for the operation. Such estimates are then available to the client workspace for reporting back to the user.

When compared to known systems which provide time estimates and progress feedback, the environment in which the present invention operates has a number of complications. In particular, the intermediary server has to deal with an open-ended set of disparate information sources at varying degrees of reliability and distance and usually outside of local control. Providing estimates is further complicated by the fact that an operation can span across multiple information sources. Merging the results received back from the multiple information sources is performed according to a query type and underlying merge timing policy. The time synthesized accounts for the query type and underlying merge timing policy.

During the course of interaction with information sources that do not provide time estimates, the intermediary server builds up a timing model for each information source of how long various operations take to execute. The model will take into account a variety of factors including network distance and the hour of day. The models are used to create completion time or first response estimates for performing various operations with the information sources.

The method of the present invention is carried out on the intermediary server and is comprised of the following steps: receive an access operation directed to multiple distal information sources, analyze the requested operation to create sub-operations for each information source and to identify merge information for the operation, said merge information specifying when and in what form results are provided back to the client workspace; retrieve the model information for each information source which does not provide a completion time estimate; generate completion time estimates for each sub-operation to each such information source based on their model; for information sources that do provide estimates, issue a set-up operation to obtain an estimate, factor in merge processing costs with selected time estimate to create time estimate; provide time estimate to the client workspace; and updating the model for information sources with new actual timing information.

DETAILED DESCRIPTION OF THE PREFERRED EMBODIMENT

A method and apparatus for providing time estimates and progress feedback on long-running distal information source access operations is disclosed. The present invention is currently implemented in a system wherein the various components have a client-server relationship. In such a relationship, a client makes requests to a server for the performance of specified services. With respect to the currently preferred embodiment, the request being made is for access to information contained on the information source. Typically, the client and server communicate using a predetermined protocol. A protocol is the formal procedure by which the client and server transfer information. However, known information sources (e.g. Dialog or Wide Area Information Services a.k.a. WAIS) communicate with clients using incompatible protocols. An important aspect of the present invention is that an intermediary server is introduced into a generic architecture for information access. As will be described below, one aspect of the intermediary server is to mediate operations with multiple information sources each of which may operate using a different protocol.

Figure 1:
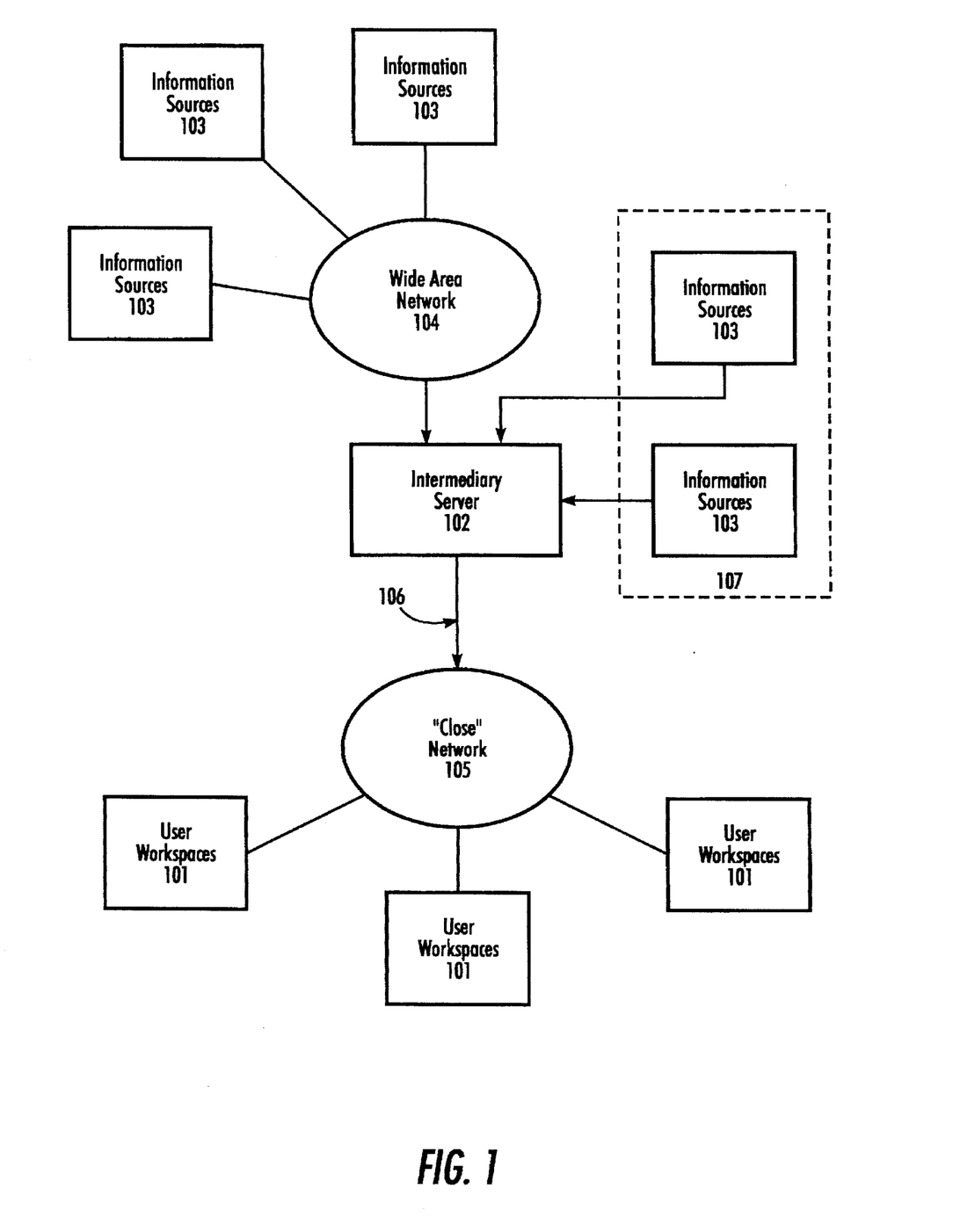
FIG. 1 is a block diagram of an information retrieval system for accessing multiple distal information sources as may be implemented in the currently preferred embodiment of the present invention.

Overview of The Information Retrieval Architecture Of The Currently Preferred Embodiment The information retrieval architecture of the currently preferred embodiment is described in the article by Ramana B. Rao et al. entitled "System Components For Embedded Information Retrieval From Multiple Disparate Information Sources", *Proceedings of 1993 ACM Symposium On User Interface Software And Technology*, Atlanta, Ga., November 1993 and is illustrated with reference to FIG. 1. Referring to FIG. 1, illustrated are three major classes of system components: user workspaces 101 (also referred to herein as clients), information sources of various kinds 103, and in between, intermediary servers 102. Each of the three major classes of system components may be implemented on a computer based system (which is described below in greater detail). The user workspaces 101 provide both browsing and search interfaces to the information sources 103. Such browsing and search interfaces are typically in the form of software based applications designed to operate in the user workspace. A browsing interface supports browsing items and collections provided by the information sources 103 and navigating from one item to other connected items. A query interface provides for the input of the various information source operations such as specifying and refining queries, controlling searches, and utilizing the results of searches in various ways.

The intermediary server 102 mediates the operations between user workspaces 101 and information sources 103. The intermediary server 102 acts as a protocol gateway. Further aspects of the intermediary server 102 are described below. In the currently preferred embodiment, the applications running in the user workspaces 101 communicate with the intermediary server 102 using a "generic" protocol 106. This generic protocol supports access to disparate information sources as well as various augmentation functions that may be performed by the intermediary server 102. In the currently preferred embodiment, the generic protocol 106 supports finding, accessing, browsing and otherwise using information contained in the various information sources 103.

Each of the information sources 103 manage a repository of information (e.g. collections of papers, articles or other document types) and provide access to such information through some protocol. The protocol may be either one of the de facto standards (e.g. Z3950 or WAIS) or a server specific protocol (e.g. as used in the Dialog On-Line information source). The intermediary server 102 communicates with an information source 103 using the protocol of the information source. In order to be accessed by the user workspaces 101, the information sources 103 must be known to or registered with the intermediary servers 102. The registration involves the provision of proper identification, security and communication information to enable sessions between the intermediary server and information source. The intermediary server 102 may couple to the information sources 103 via a connection over a wide area network 104 (e.g. the Intenet), or via direct point to point connections 107.

The Intermediary Server

The intermediary server 102 analyzes operation requests (e.g. queries) from the user workspaces 101 and creates one or more sub-operations using and conforming to the specific protocol(s) and features of the specified information sources. The intermediary server 102 also provides various services for enabling a user to make more effective and efficient use of the information sources (e.g. information describing the available information sources or estimates on the cost of performing an operation on particular information sources). Such services may be accessed by the user workspace using an interface specified in the generic protocol 106.

It is desirable that an intermediary server be "close" to the client workspace (illustrated in FIG. 1 as "close" network 105). Closeness is defined to be a reliable connection to the user workspace where the latencies and delays between the two are predictable and short (on a user scale of a few hundred milliseconds). An example of being "close" is the client workspace and the intermediary server residing on the same computer based system or being on the same local area network with reliable latencies and performance. However, it should be noted that close does not have to mean physically close. Networking technologies such as the Asynchronous Transfer Mode (ATM) provide the characteristic of closeness for computer based systems that may be geographically far apart.

As noted above, the intermediary server provides access to registered information sources from the user workspace. The information sources may or may not provide reporting mechanisms for time estimation on access operations and progress feedback during operation execution. The intermediary server "synthesizes" time estimates and progress feedback possibly utilizing the reports of the more capable information sources directly. In operations involving multiple information sources, the intermediary server combines all available information to provide a single integrated source of reporting to the client.

For information sources that do not provide time estimates or progress feedback, the synthesis by the intermediary server utilizes the history of prior interactions with the information source. In the course of providing access to information sources, the intermediary server builds up a model for each information source that does not provide feedback. The model is used to store information as to how long various operations take on an information source. This model can take into account both implicit and explicit factors. Implicit factors include network distance, operation complexity or regular delays at information source. Explicit factors include hour of day and operation type. This model, in its simplest form a table which is indexed by the explicit factors, allows estimating how long an operation (e.g. a search or document transfer) is going to take.

The synthesized time estimate for completion of the operation is then used as a basis to generate periodic progress estimates. A decaying function which never reaches a percentage done of 100 is used. An example of such a function is $1-e^{-t}$, where t=elapsed time/synthesized time estimate. When the servers report completion, the progress can be reported as 100.

When searches are performed across multiple sources, estimates/progress of the various subparts can be combined whether they originate from the history based models, directly from sources, or any other source.

Figure 2:
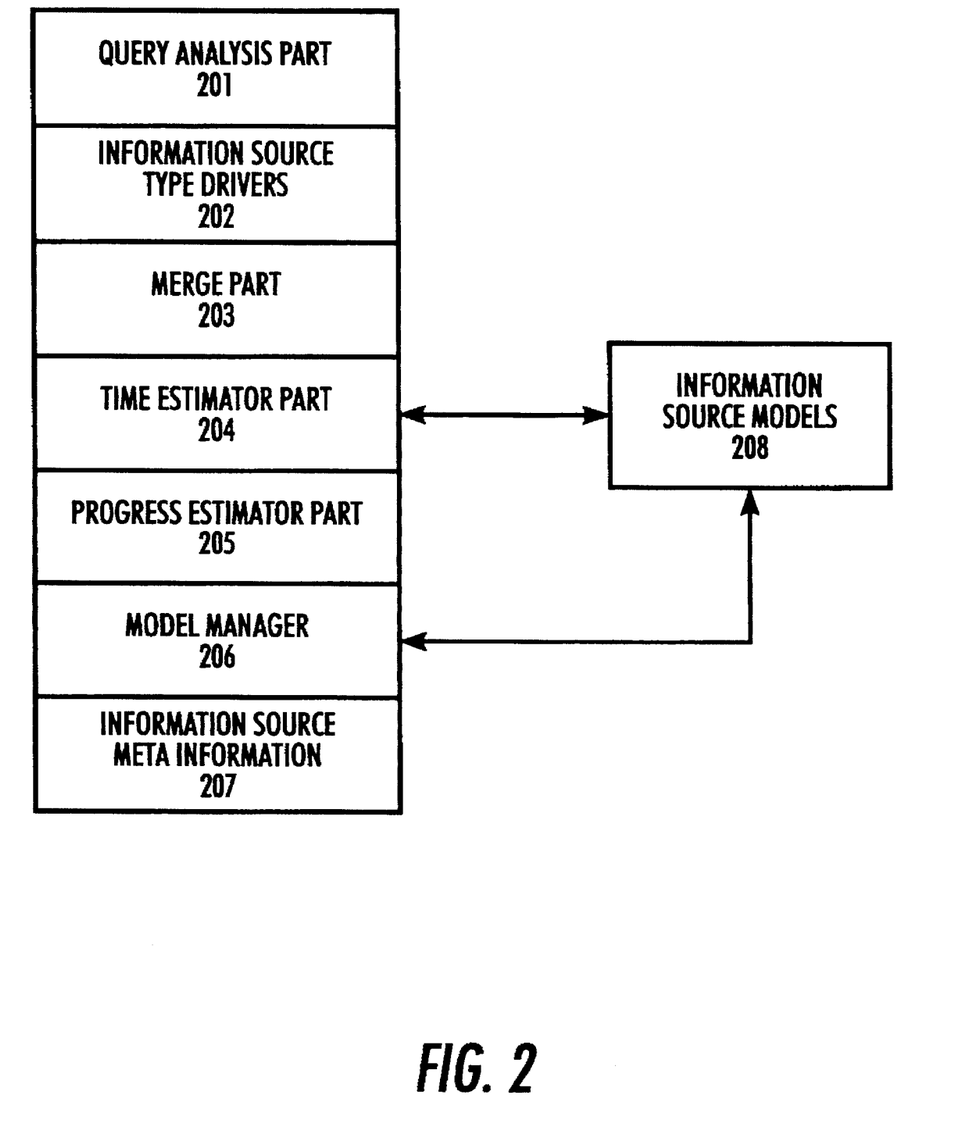
FIG. 2 is a block diagram of the functional components of an intermediary server in the currently preferred embodiment of the present invention.

FIG. 2 illustrates the functional components of an intermediary server. Referring to FIG. 2, an intermediary server is comprised of an operation analysis part 201, information source type drivers 202, a merging part 203, time estimator part 204, progress estimator part 205, model manager 206 and an information source meta-information part 207. Also illustrated are the information source models 208 which are typically found on an attached storage means.

The operation analysis part 201 analyzes an operation request to set-up the flow of processing that must be performed to satisfy the operation request. The operation analysis part will determine how the operation request may best be handled, group the specified information sources by type and identify merge information associated with the operation. An operation request may be handled exactly, approximately or degraded. An operation request handled exactly is one where the operation may be performed exactly as specified (e.g. the information sources specified can perform the requested operation). The choice of how an operation request is handled depends on the complexity of the requested operation and the capabilities of the specified information sources. An operation request that is handled approximately is one where it is determined that the operation request cannot be handled exactly, but the gist of the request can be maintained. For an operation request that is handled degraded, a portion of the request is handled (e.g. the information sources can provide partial results responsive to the request.)

The information source type drivers 202 each handle a specific information source type. An operation mapping function and a protocol translation function is performed by each driver. Each information source type operates using the same protocol and has a common set of functions. Each driver will translate an operation specified in the generic protocol into one or more sub-operations using the protocol of the information source type. In some cases there is not a one to one correspondence to the functionality specified in the generic protocol with functionality provided by the information source. The drivers will accommodate for such dissimilarities. For example, an information source type may not be able to provide a proximity search looking for keywords within a specified distance. The given driver would then cause the performance of various sub-operations and merging in order to perform the desired functionality (such as a search for each keyword and subsequently determining if they are within the specified proximity).

The merge part 203 merges the results obtained from the various information sources according to the merge information obtained from the operation analysis. The merge information is comprised of a merge timing policy, i.e. when results are to be merged and provided to a user, and a merge manner policy, i.e. how the results are to be merged and analyzed. The merge part 203 also perform various functions on the results of sub-operations to obtain the desired results (e.g. where proximity analysis is not handled by the information source).

The time estimator part 204 generates the estimated time for performing an operation and the progress estimator part 205 is used to generate the estimates of the progress of an operation. Both are described in greater detail below.

The model manager 206 is used to update the information source models based on actual operations performed on information sources.

The meta-information part 207 permits a user to readily obtain information about the registered servers. This is useful for enabling a user to select the particular information sources that they would like to include in their query. Obtaining such meta-information by the user workspaces is supported by the generic protocol.

The information source models 208 contains the models for each of the registered information sources that do not provide any timing information. The composition of the information source models is described with respect to FIG. 7.

The functional components of the intermediary server illustrated in FIG. 2, are preferably implemented in software residing in storage and which is accessible by a computer based system. Moreover, the intermediary server may be implemented within an information retrieval system in various ways. In one instance, as illustrated in FIG. 1, the intermediary server resides on a system which resides on the same network as the system on which the various user workspaces reside. It would also be possible to implement the intermediary server on the same system as the user workspaces. Such an implementations would not depart from the spirit and scope of the present invention.

Operation of the Intermediary Server

Figure 3:
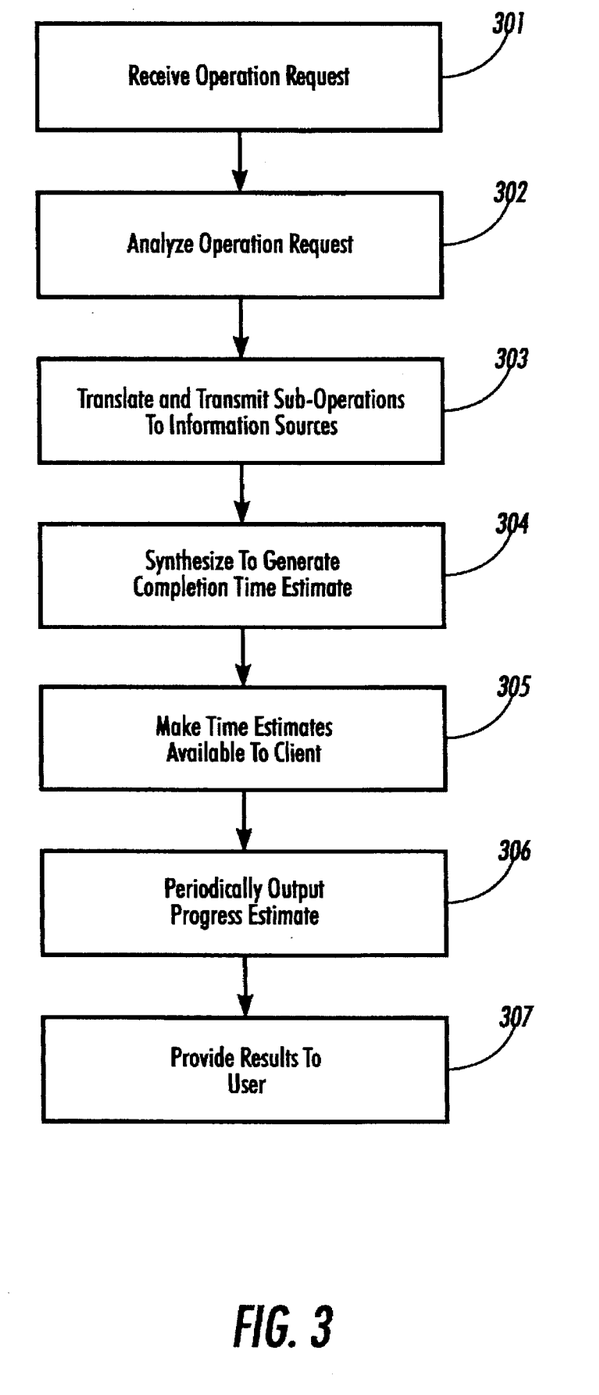
FIG. 3 is a flowchart illustrating the general steps for performing operation requests on information sources including time and progress estimation functions.

FIG. 3 is a flowchart which illustrates the operation of the intermediary server of the currently preferred embodiment of the present invention. Referring to FIG. 3, the intermediary server receives an operation request from a user workspace, step 301. Such an operation may be a query to identify a set of documents, or an operation to retrieve a set of documents. A query operation request is comprised of a list of information sources and the query parameters for identifying the desired set of documents. A retrieve operation request identifies the desired documents (which implicitly indicate the information sources containing them). Both operation requests may also specify how the results of the operation would be provided to the user, and whether any analysis on the results would be performed (e.g. ordering of the results based on selection criteria). The operation request is then analyzed and corresponding sub-operations created, step 302. The operation request is initially analyzed because not all information sources can handle all requests, or can handle all requests in the same way. The first step of this analysis is comprised of grouping information sources of the same type (e.g. communicate using the same protocol). A separate mapping exists for each of the different information source types to map the requested operation to corresponding operations of the information source type. This mapping is then performed for each of the identified information source types. As a result of this analysis, a set of sub-operations corresponding to the original operation request is created for each information source. The sub-operations are the atomic operations used to service the request. A sub-operation corresponds to the biggest single request that can be issued to an information source. In some cases there will be the same number of sub-operations issued to each information source. In other cases there may be some information sources that support combinations of requests and some information sources that do not, so the number of sub-operations for the information servers can be different. Finally, the analysis portion may cause the query to be re-written for a particular information source. As described above, the query may be exact, approximate or degraded depending on the query and the specified information sources After the operation analysis, each sub-operation is translated into the protocol of the target information source and transmitted, step 303. In some cases however, one sub-operation may require the result of another before it can be invoked. In these cases, the sub-operation will be held and transmitted when the sub-operation that it depends on is completed.

Concurrent with transmission of the sub-operations to the various information sources, time estimates are synthesized, step 304. The time estimates synthesized include a completion time estimate and an estimate to receive the first result. The synthesis of the completion time estimate is described in greater detail below. The estimate to receive the first result is merely the estimated time of the first completed sub-operation. The time estimates are then available to the client and can be used as user feedback for the requested operation, step 305. The client may then present to the user the time estimate information. This is all left up to the user interface. Further, at this point it may be desirable to provide the user with an option to cancel the operation (e.g. they determine that the operation will take too long or will cost too much).

Assuming that the operation is performed, periodic output progress estimates are returned to the client based on the original completion time estimate and any other intermediate results or other information that has been received, step 306. Note that if information that is received indicates a bad initial estimate (e.g. a sub-operation completes very early), the completion time can be re-calculated. The new completion time could then be used for subsequent progress estimates. When the operation is complete, the results of the operation request are provided to the user as specified in the operation request, step 307.

Synthesizing A Time Estimate

In the currently preferred embodiment, two time estimates are provided with the generated estimation data; one is an estimate of when a "first result" would be returned and the other is an estimate of the completion of the entire operation. It should be noted that queries which include analysis of the entire result set may not utilize the "first result" estimate, but such information may still be generated. The provided time estimate is also dependent on the merge timing policy defined by the user for the operation. The merge timing policy refers to when results are merged and provided to a client (an important issue since the results may come from multiple information sources.) The merge timing policy further influences estimation of merge processing costs.

Figure 4:
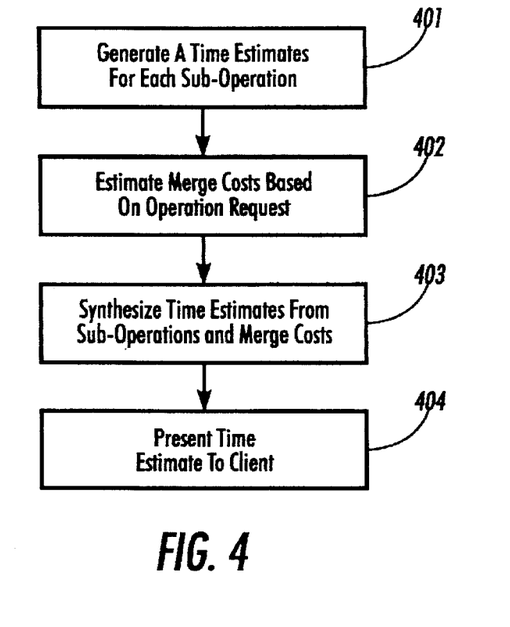
FIG. 4 is a flowchart illustrating the basic steps for synthesizing a time estimate from a set of time estimates for sub-operations as may be performed in the currently preferred embodiment of the present invention.

FIG. 4 is a flowchart describing the basic steps for synthesizing a time estimate. First a set of time estimates are generated for each sub-operation performed on the respective information sources, step 401. The details of the generation of a time estimate for an information source is described below with reference to the flowchart in FIG. 5. A merge processing cost is then estimated, step 402. The merge processing costs are estimated based on the merge information obtained through operation analysis. Merge processing costs are described in greater detail below.

From the sets of time estimates and the merge processing costs, the time estimates are synthesized step 403. By synthesized it is meant that the estimates for each of the sub-operations are examined and the merge processing costs factored in. The time estimates are then provided to the client, step 404. Generally, the estimated time it will take for an information source to return a response that may be provided to the client is the "first response" estimate. The completion time estimate is generally the time it takes for the a "last" result to be returned (e.g. the longest estimated time for a sub-operation) combined with the merge processing costs.

Figure 5:
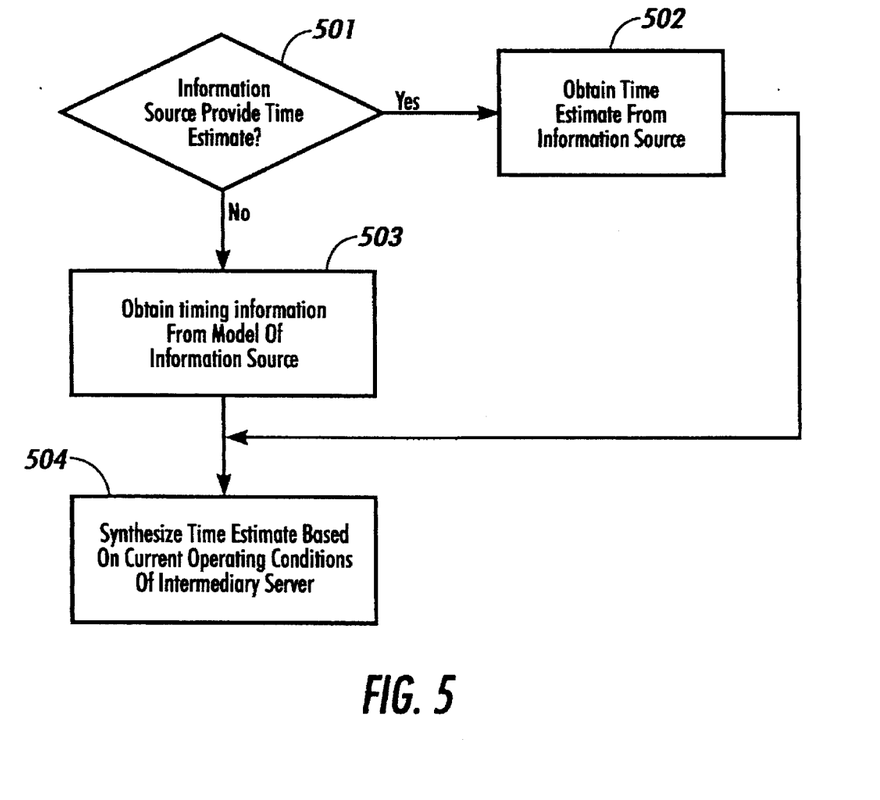
FIG. 5 is a flowchart illustrating the steps for generating a time estimate for a sub-operation as may be performed in the currently preferred embodiment of the present invention.

FIG. 5 is a flowchart illustrating the steps for generating a time estimate for each of the sub-operations. Referring to FIG. 5, it is first determined whether or not the information source provides a time estimate, step 501. If it does, the estimate is obtained from the information source, step 502. This could be accomplished for example by simply issuing a setup of the particular sub-operation and requesting the time estimate. If the information source does not provide the time estimate, timing information from a model of the information source is obtained, step 503. In this case, the information in the model is indexed by the operation type and the time of day (though other explicit factors could be used as indices). As will be described in greater detail below, the historical model of an information source is typically a table. This will provide an "estimated" time based on past invocations of the sub-operation on that information source from the intermediary server. If there is no history for a particular sub-operation at a particular time, a default value, e.g. 4 seconds, can be used. Other techniques for providing a default value, e.g. an average of all operations with an information source could be utilized. This estimated time is then synthesized based on current operating conditions of the intermediary server, step 504. Such operating conditions may include system load or network overhead specific to the information server.

Merge Processing Costs

An operation request in the currently preferred embodiment permits a user to specify how and if the results of an operation should be subsequently analyzed. Because the results are being returned from multiple information sources, the results must be merged together for presentation in a cohesive fashion. Merge processing costs will depend on what analysis, if any, the user requests. Furthermore, an operation request such as a query can be one where the results are ranked (a ranking queries) or are not ranked (non-ranking queries). Ranking queries are those queries which induce a relevance ordering on the items in the search result, for example, similarity queries. Non-ranking queries are inherently Boolean; either an item satisfies a query or it does not, and there is no reason to say that one item in the result is more relevant than another. Proximity and attribute-value queries fall into this category.

it should also be noted that results need not be merged. An operation request may specify that results be returned as they are received. Alternatively, results may be provided as received with subsequent ranking results provided when all results have been received.

The currently preferred embodiment supports several merging strategies for the results of non-ranking queries: round-robin, scope-ordered or sort-by-field. Round-robin is a simple scheme in which one result item from each of the information sources is provided in turn. Scope-ordered provides the result items sorted according to the ordering of information sources specified in the operation request. Sort-by field orders the results according to the value of some attribute of the items, for example, the publication date.

In addition to the above, ranking queries can support two other merging strategies, both based on relevance scores given to each item in the result. The strategies are termed source-score and normalized-score. In source-score, the relevance score for each item returned from the information source is used in the ranking. In normalized-score, the scores returned from the information source are normalized using a scaling factor determined by examining the score and context of the first result.

The currently preferred embodiment further supports incremental merge strategies. This enables a user to view results incrementally and not have to wait until all results have been returned. So for example, a user may be able to get incremental results based on completion of a particular sub-operation by all specified information sources.

Another component of merge processing costs is any processing that is required in order to more closely satisfy an operation request (e.g. a proximity search derived from an information source that does not provide such searches). This again may be some constant.

Estimating the merge processing costs is accomplished by providing a fixed constant for each merge manner policy which is then influenced by the merge timing policy. The fixed constants may be modified depending on the system load on the intermediary server. So once the merge timing policy and merge manner policy are identified, the component merge processing costs are combined to obtain the resultant merge processing cost. So if the merge timing policy is to wait until everything is returned, all the processing is accounted for. If the merge timing policy is first result, only the processing pursuant to the merge manner policy until the first result is returned need be accounted for.

Synthesizing Progress Feedback

Figure 6:
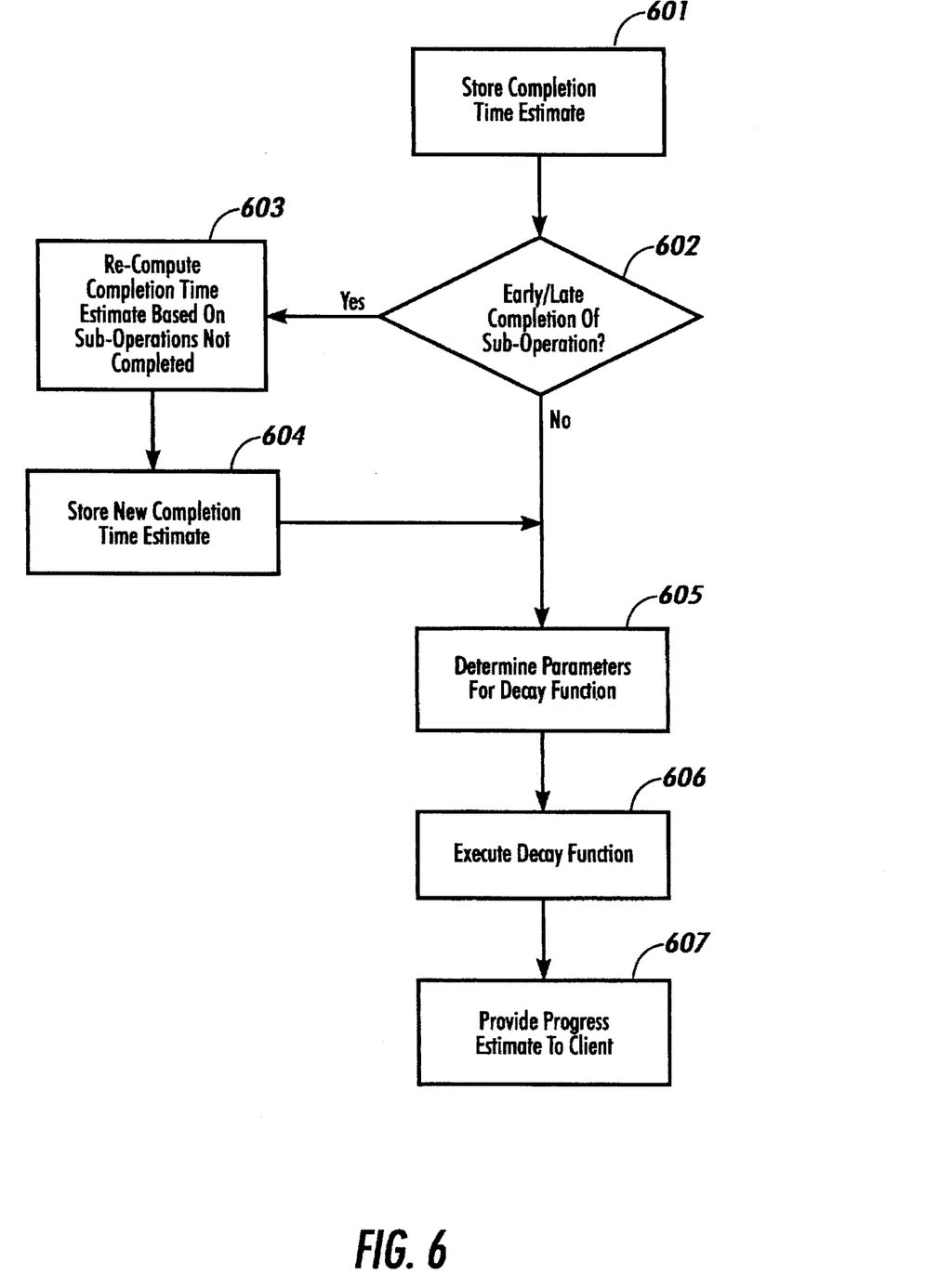
FIG. 6 is a flowchart illustrating the steps generating progress estimates as may be performed in the currently preferred embodiment of the present invention.

FIG. 6 is a flowchart illustrating the steps in generating progress estimates. Referring to FIG. 6, the completion time estimate is stored, step 601. It is then determined if sub-operations have completed sooner or later than estimate by a predetermined thresholds, step 602. If yes, this would tend to skew the earlier estimates. In this case, the completion time estimate is again synthesized based on the remaining sub-operations not yet completed, step 603. This new estimate is then stored, step 604. In either case, parameters for a decay function are then determined, step 605. As noted above, the decay function has the property that it decreases but never reaches a percentage complete of 100%. In the currently preferred embodiment a decay function based on the equation $1-e^{-t}$, where t=elapsed time/estimated time is utilized. However, utilization of other decay functions having the same basic properties could be utilized without departure from the spirit and scope of the present invention. Utilizing the aforementioned decay function, the values for determining the variable "t" represent the necessary parameters. The decay function is then computed, step 606 and the result is the progress estimate which is returned to the client, step 607.

Although the completion time estimate is described, it would also be possible to substitute a "first result" estimate to obtain progress estimate information for that case.

Details of a Model

Figure 7:
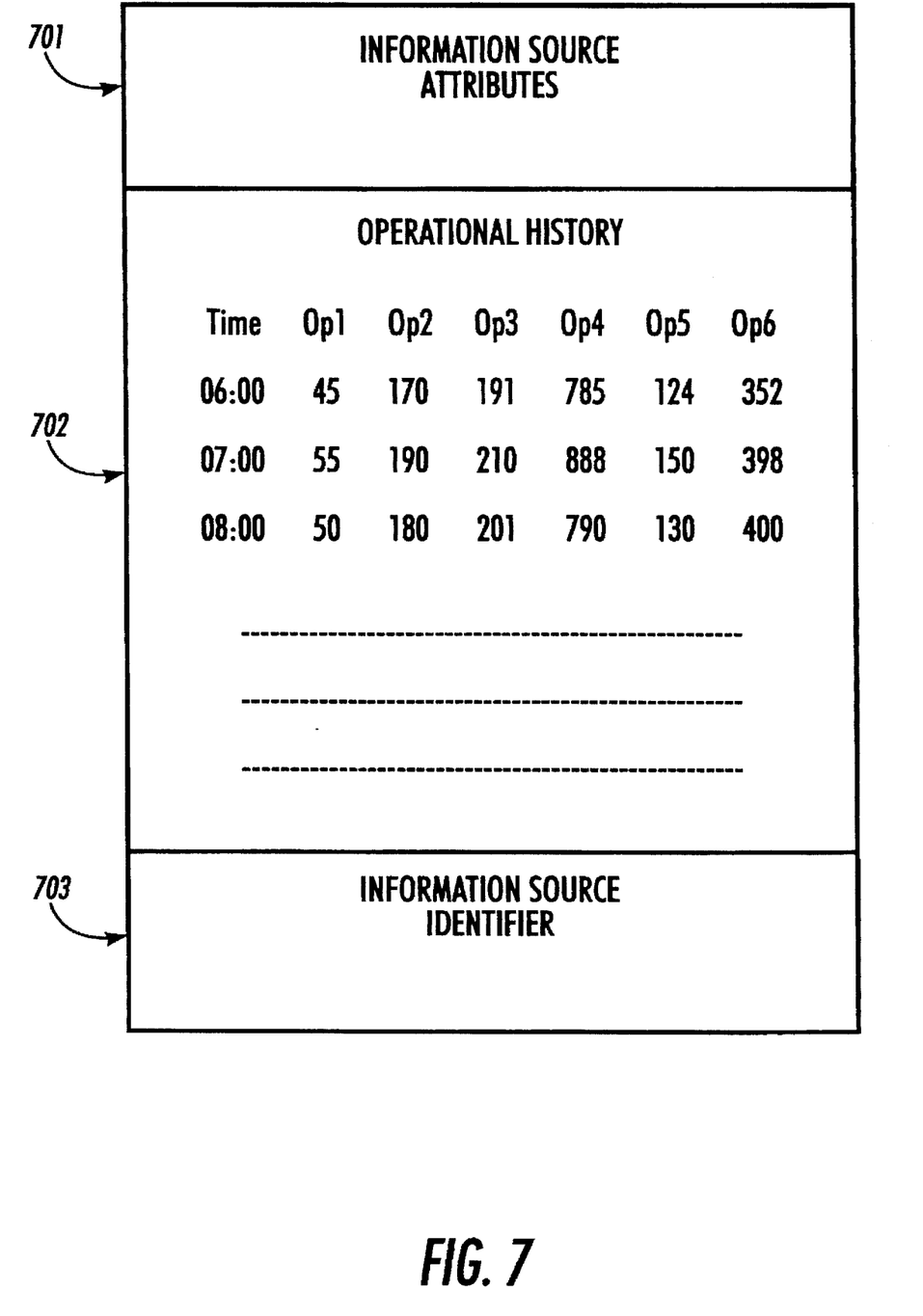
FIG. 7 is an illustration of a model for an information source as may be implemented in the currently preferred embodiment of the present invention.

The model in its simplest form is stored as a table which is indexed by information source name, operation and time. Each information source will have its own model. The models are used by all clients of the intermediary server, so even though a particular user may have no experience with a particular information source, the experiences of others is captured and is used for providing timing estimates. Various well known data management techniques for access and retrieval of information could be utilized for implementing the collection of models that would be utilized in the present invention. FIG. 7 illustrates a model for an information source. Referring to FIG. 7, a model includes a information source attributes part 701 which contains information related to the network path, distance, line speeds and other physical characteristics involved in the coupling of the information source with the intermediary server. The operations history part 702 is used to maintain a history relating to the performance of any user workspace accessing the information source through this intermediary server. As illustrated, the operations history part is organized and indexed by time and operation. So for example, at 07:00 a search operation OP2 may take 190 seconds. Generally, some amount of granularity in the time domain is maintained, e g. hourly timing information. Finally, an information source identifier 703 is specified. The information source identifier 703 provides a high level index to the model.

It should be noted that herein the term operation used with respect to a model correspond to the sub-operations that are parsed out of an operation request from a user workspace (i.e. the atomic operations).

Figure 8:
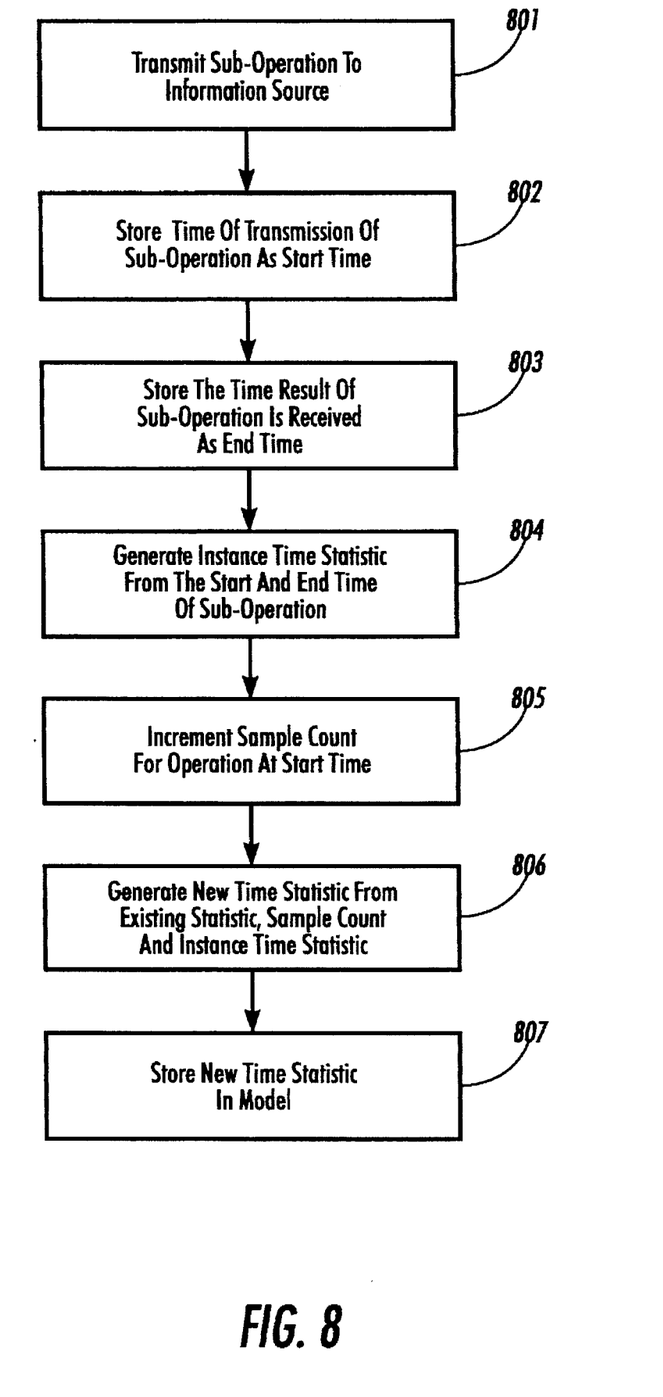
FIG. 8 is a flowchart illustrating the steps for building and/or updating a model of an information source as may be performed in the currently preferred embodiment of the present invention.

FIG. 8 is a flowchart describing the steps for updating the operations history part of a model Referring to FIG. 8, a sub-operation is transmitted for execution, step 801 and the time the sub-operation is transmitted is stored as a start time, step 802. The sub-operation start time is used as the index or "bucket" into which this particular instance of a sub-operation will be added (i.e. averaged into). The sub-operation is then performed at the information source and the time that the result is received at the intermediary server is stored as an end time in temporary storage, step 803. A time statistic is then generated for this instance of the sub-operation by determining the difference between the start and end times, step 804. In either event, once the instance statistic is generated, a sample count for the particular operation at the particular time is incremented, step 805. The instance statistic, the time already in the "bucket" and the sample count are then combined to create the new time statistic for the bucket, step 806. The new statistic is then stored back in the "bucket" location in the model, step 807.

Figure 9:
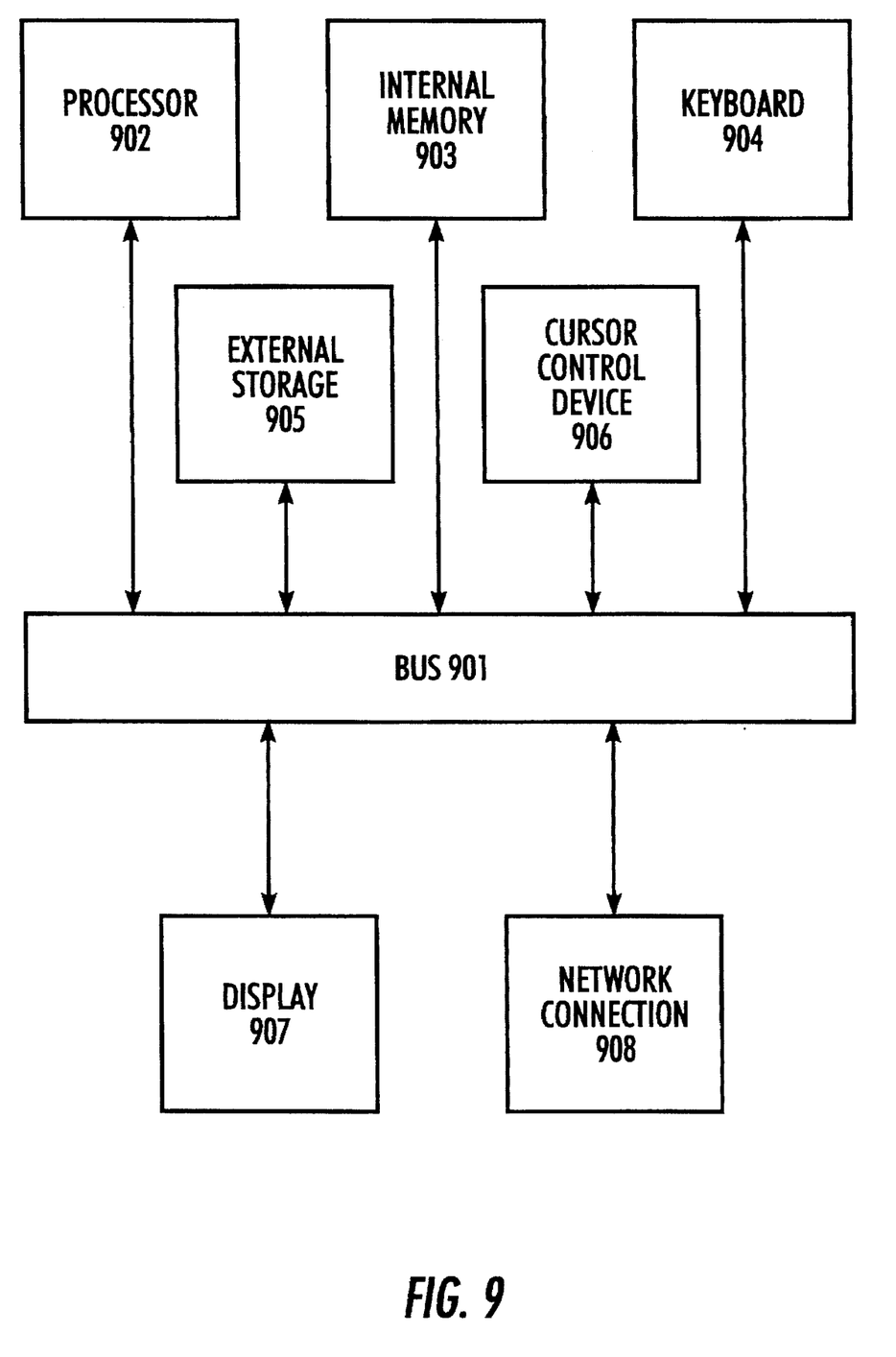
FIG. 9 is a block diagram of a computer based system upon which the various user workspaces, information sources and intermediary servers may be implemented.

Computer Based System of the Currently Preferred Embodiment of The Present Invention The computer based system on which the currently preferred embodiment of the present invention may be implemented is described with reference to FIG. 9. Referring to FIG. 9, the computer based system is comprised of a plurality of components coupled via a bus 901. The bus 901 illustrated here is simplified in order not to obscure the present invention. The bus 901 may consist of a plurality of parallel buses (e.g. address, data and status buses) as well as a hierarchy of buses (e.g. a processor bus, a local bus and an I/O bus). In any event, the computer system is further comprised of a processor 902 for executing instructions provided via bus 901 from Internal memory 903 (note that the Internal memory 903 is typically a combination of Random Access or Read Only Memories). The processor 902 and Internal memory ROM 903 may be discrete components or a single integrated device such as an Application Specification Integrated Circuit (ASIC) chip.

Also coupled to the bus 901 are a keyboard 904 for entering alphanumeric input, external storage 905 for storing data, a cursor control device 906 for manipulating a cursor, and a display 907 for displaying visual output. The keyboard 904 would typically be a standard QWERTY keyboard but may also be telephone like keypad. The external storage 905 may be fixed or removable magnetic or optical disk drive. The cursor control device 906 will typically have a button or switch associated with it to which the performance of certain functions can be programmed. Further coupled to the bus 901 is a network connection 908. The network connection 908 is used to receive and/or transmit data between computer based systems.

EXAMPLE

The following example illustrates the time and progress estimation of the present invention. The intermediary server receives an operation request from a client for a query Q be performed over three information sources S1, S2, S3 (sometimes referred to as the query scope). The merging information in the query further specifies that the final results be merged and returned in normalized rank order. Note that this merge specification may be indicated by a specific query type or as a parameter in the operation request.

As the first step, the operation request is analyzed. It is determined that S1 and S2 are of the same information source type (call IS1) and S3 is of a different information source type (call IS2). The query Q is then provided to the respective IS1 and IS2 drivers to determine the sub-operations that will satisfy query Q. The driver mapping results in three sub-operations OP1, OP2, OP3 are performed on S1 and S2 and sub-operations OP4, OP5 are performed on S3 and that no additional processing on the results of the sub-operation is required to obtain a result of the sub-operation. Each information of the sub-operations performed on an information source will also have a corresponding query (which may also include merge specifications). The resulting sub-operations are represented below with the syntax (sub-operator identifier, information source, query expression):

(Op1, S1, Q1) (OP1, S2, Q2)
(OP2, S1, Q3) (OP2, S2, Q4)
(OP3, S1, Q5) (OP3, S2, Q6).
(OP4, S3, Q7)
(OP5, S3, Q8)

The time of the query is approximately 11:00:00 GMT. Assuming that models exist for each of S1, S2 and S3, the following time estimates are obtained from the models for the various sub-operations:

For sub-operation OP1:
  (Op1, S1, Q1): 200 seconds
  (Op1, S2, Q2): 220 seconds
For Sub-Operation OP2:
  (OP2, S1, Q3): 400 seconds
  (OP2, S2, Q4): 595 seconds
For Sub-Operation OP3:
  (OP3, S1, Q5): 210 seconds
  (OP3, S2, Q6) 230 seconds
For Sub-Operation OP4
  (OP4, S3, Q7): 250 seconds
For Sub-Operation OP4
  (OP5, S3, Q8): 300 seconds An estimate of the merge processing costs must now be made. To estimate the merge processing costs the type of query performed and the underlying merge timing policy are determined. As the query requests a normalized scoring of the results, the sub-operations must specify scoring from the information sources. Thus, the merge timing policy is that all the results must be received from all the information sources. A scaling factor is then applied to the results. For this example, it is assumed that the fixed constant for this kind of merge is 5 seconds.

Recall that the time estimates generated are a first result estimate and a completion time estimate. The first result estimate is simply a matter of identifying the time where a sub-operation will first return a result. In this case that would be (OP1, S1, Q1): 200 seconds. However, in this example the operation request specified a ranked result, the first result estimate may not provide relevant information. However, it is anticipated that the support for incremental merging (e.g. some rank ordering of partial results) could be provided. For example, the results of sub-operation 1 from all the information sources could be ordered and returned to the client as an incremental result. Thus, it could be useful to determine a time when all results of OP1 are estimated to be returned, figure in the merge processing costs, and provide the sum as an estimate of a first result. In this case it would be (OP1, S2, Q2): 220 seconds +5 seconds of merge processing costs for an estimate of 225 seconds.

With respect to the completion time estimate, it is a matter of determining the duration when the last result will be returned and then factor in the merge processing costs. In this case it is (OP2, S2, Q4):595 seconds. Thus, the completion time estimate would be 595 seconds+5 seconds or 600 seconds.

An example of progress estimation based on the example above with respect to time estimates is now provided. From above, the completion search estimate is estimated as 600 seconds. Assuming that all sub-operations execute according to the original estimates, the time estimate at 100 second intervals in a strictly linear sense and without a sub-operation completion time causing new calculations would be:

| Elapsed Time | Progress (as Percentage Complete) |
| --- | --- |
| 100 Seconds | 17% |
| 200 Seconds | 34% |
| 300 Seconds | 50% |
| 400 Seconds | 67% |
| 500 Seconds | 83% |

Thus, an information retrieval system providing time estimates and progress feedback on long-running distal information source access operations is disclosed. While the present invention is described with respect to a preferred embodiment, it would be apparent to one skilled in the art to practice the present invention with other configurations of information retrieval systems. Such alternate embodiments would not cause departure from the spirit and scope of the present invention.

We claim:

1. In an information retrieval system having an intermediary server to mediate operation requests from a user workspace to one or more information sources, a method for generating time estimates for operation requests specifying multiple information sources from said intermediary server, said method comprising the steps of:

a) generating and maintaining operation timing models for each of said information source, each of said models storing timing information by operation and predetermined clock interval;

b) receiving an operation request, said operation request specifying a plurality of information sources and merge information;

c) grouping said plurality of information sources by type;

d) for each information source type, mapping said operation request into one or more sub-operations;

e) retrieving time estimates for each of said one or more sub-operations from the corresponding information sources model;

f) determining a merge manner policy and merge timing policy from merge information;

g) determining a merge processing cost associated with merge manner policy and merge timing policy; and h) synthesizing a time estimate from said retrieved time estimates and said merge processing cost.

2. The method as recited in claim 1 further comprising the steps of:

I) transmitting said sub-operations to corresponding information sources;

j) generating progress estimates based on elapsed time and said synthesized time estimate.

3. The method as recited in claim 2 wherein said step of generating and maintaining operation timing models for said information sources is further comprised of the steps of:

a1) saving a start time for a sub-operation;

a2) saving an end time upon the completion of said sub-operation;

a3) calculating an instance operation time based on said saved start time and said saved end time;

a4) averaging said instance operation time with any existing entry at a storage location for said sub-operation; and a5) storing said result of step a4) at the location corresponding to the start-time of said sub-operation.

4. An information retrieval system for searching and accessing documents from a plurality of information sources, said information retrieval system comprising:

one or more user workspaces having means for invoking search and access operations over one or more of said plurality of information sources, said operations specifying the information sources to which the operation is to be performed;

an intermediary server coupled to said one or more user workspaces and said plurality of information sources, said intermediary server for mediating operations between said one or more user workspaces and said plurality of information sources, said intermediary server comprising:

operation analysis means for analyzing an operation resulting in one or more sub-operations for each information source specified in said operation;

modeling means for storing and maintaining timing information for sub-operations performed on said information sources, said timing information based on prior instances of sub-operations performed on said information sources;

time estimate means for synthesizing an operation completion time estimate based on sub-operation timing information obtained from said modeling means; and progress estimate means for providing operation progress information of a requested operation based on said operation completion time estimate, said progress time estimate means coupled to said time estimate means.

5. The information retrieval system as recited in claim 4 wherein said operation further specifies merge information and said time estimate means is further comprised of means for combining a merge processing cost associated with said merge information with said sub-operation timing information.

6. The information retrieval system as recited in claim 5 wherein said intermediary server is further comprised of a merging means for merging the results of sub-operations performed on said specified information sources according to said merge information.

7. The information retrieval system as recited in claim 4 wherein said modeling means is further comprised of storage means for storing information representing said models and updating means for updating said information representing said models responsive to an operation performed on an information source.

8. The information retrieval system as recited in claim 7 wherein each of said models is comprised of a first area for storing information source attributes about said corresponding information source and a second area for storing timing information for the various sub-operations, said second area organized for storing timing information for predetermined clock intervals.

9. The information retrieval system as recited in claim 4 wherein said time estimation means is further for synthesizing a first result completion time estimate.

10. An information access system comprising:

a distal network for providing communication with one or more distal information sources;

a local network for providing access with predetermined performance characteristics;

a first processor for executing instructions stored on a first storage medium, said instructions on said first storage medium causing said first processor to operate as a user workspace for inputting operation requests for obtaining information from said one or more information sources, said first processor coupled to said local network;

a second processor executing instructions stored on a second storage medium, said instructions on said second storage medium causing said second processor to mediate operation requests from said first processor to said one or more information sources and to synthesize timing and progress estimates based on prior interactions with said one or more information sources, said second processor coupled to said local network for communication with said first processor and said distal network for communication with said one or more distal information sources.

* * * * *